May 4, 1965  P. MARATUECH ETAL  3,182,211
ELECTRONIC SYSTEMS FOR ELECTRIFYING ENCLOSURES
Filed Feb. 14, 1961  3 Sheets-Sheet 1

INVENTOR
PAUL MARATUECH
RENÉ BERNADA

BY Samuel L Davidson

ATTORNEY

INVENTOR
PAUL MARATUECH
RENÉ BERNADA

BY Samuell L Davidson

ATTORNEY

United States Patent Office 3,182,211
Patented May 4, 1965

3,182,211
ELECTRONIC SYSTEMS FOR ELECTRIFYING ENCLOSURES
Paul Maratuech, La Garenne Colombes, and René Bernada, Paris, France, assignors, by mesne assignments, to Inventions Finance Corporation, a corporation of Delaware
Filed Feb. 14, 1961, Ser. No. 89,255
Claims priority, application France, May 4, 1960, 826,166; Sept. 21, 1960, 839,114
22 Claims. (Cl. 307—132)

This invention relates generally to electrified fences, enclosures, barriers, or the like, and more particularly to improved electronic systems for electrifying such fenced enclosures controlled by contact of an animal, object or being with the fence.

The apparatus for electrifying fenced enclosures currently in greatest use comprises a choke coil having duplex windings of high transformation ratio combined with a contact arrangement such as to pass current in the primary winding from a low voltage source for a very short period of time at periodic intervals. The contact arrangement is driven by a spring tensioned balance arm or pendulum whose continued movement is provided for by a magnetic field created by the passage of current in the choke coil. Thus the balance arm periodically opens and closes the contacts and induces in the secondary winding of the choke coil pulses of electromotive force of high amplitude which are applied to the fenced enclosure. Eventually, upon contact of an animal between the enclosure and the ground, current will be passed through the animal and the shock will cause the animal to move away from the barrier, or fence. The electrification of the fence is thus constituted by a series of frequent electric impulses governed by the balance arm contacts. This continuous but interrupted electrification of the fence will soon permanently discharge the low voltage battery whether or not there is a contact with the fence. The high cost of batteries or of electricity in certain areas thus makes use of the current apparatus expensive. This is even more so, when the education of the animals is completed and the number of contacts with the fence are reduced, at which time the current applied to the fence represents useless energy and expense which may reach a proportion as high as 95%.

Consequently some devices have been proposed for electrifying fenced enclosures whose discharge is controlled only during contact with the enclosed wire. Such devices generally use a thyratron of the cold cathode type connected with a capacitor that is charged to a voltage of about 100 volts from a high voltage energy source. The thyratron is arranged to fire when a contact with the enclosure and the ground occurs causing the capacitor to discharge in the primary winding of the duplex coil and a high voltage pulse appears at the terminals of the secondary winding connected to the enclosure. This device also presents a certain number of disadvantages: if a wet or electrically conducting branch or other electrically conducting inanimate object permanently touches the enclosure wire the thyratron remains in firing condition and the apparatus cannot function to shock an animal subsequently contacting the fence. To overcome this difficulty, it would be necessary to use an extremely high tension source and thus a much more expensive one.

It is a primary object of the present invention to provide an electrifying apparatus for fences, barriers and the like which obviates the above stated disadvantages of current apparatus.

It is another important object of the present invention to provide fence electrifying apparatus which operates only during periods of contact with the fenced enclosure wire and which uses a low voltage power source, consequently greatly reducing the amount of electric energy used and the cost thereof and which does not drain the power source when accidental contact is made through a wet branch or the like.

Another object of the present invention is to provide an electrifying apparatus of the character indicated above wherein a high gain amplifier is utilized to trigger a high potential generator for applying voltage to the fenced enclosure, said amplifier being operated by a change of impedance between the enclosure and ground caused by contact of an animal or object with the enclosure.

A further object of the invention is to provide an electrifying apparatus for fenced enclosures of the character indicated above in which means is incorporated for preventing damage to the amplifier stages by reason of the high potential surges occurring when the fence is energized.

Still another object of the invention is to provide means for converting existing electrifying apparatus by the addition of a high gain amplifier and associated circuits to the apparatus which will operate to energize the fence only upon contact of an object therewith.

Yet another object of the present invention is to provide an electrifying apparatus for a fenced enclosure of the character indicated above in which an oscillator and rectifier are included to augment the low potential power source and thereby increase the sensitivity of the apparatus.

The novel features that are considered characteristic of the invention are set forth with particularity in the appended claims. The invention itself, however, both as to its organization and its method of operation, together with additional objects and advantages thereof, will best be understood from the following description of specified embodiments when read in connection with the accompanying drawing, wherein like reference characters indicate like parts throughout the several figures and in which:

*Basic principles*

Figure 1:
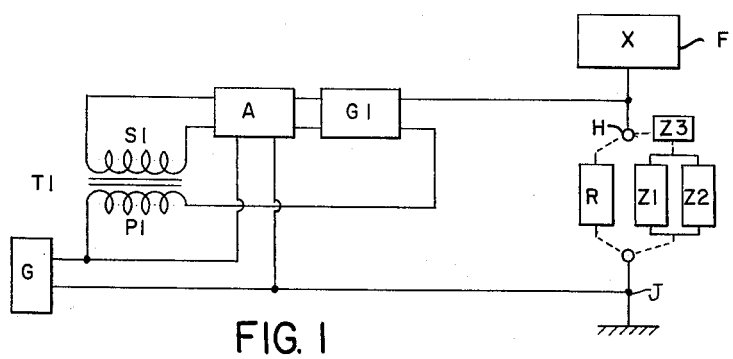
FIG. 1 is a block diagram illustrating the principles on which the invention is based.

The fundamental principles of the invention will now be described referring to FIG. 1, which shows a fence X schematically represented by a wire F connected to terminal H of the electrifying device. The following circuit is completed between this wire, i.e. terminal H, and the earth (terminal J), when a conducting medium contacts the fence and the ground simultaneously: from D.C. supply G, through primary winding P1 of triggering transformer T1, through high tension (voltage) generator G1, through the conducting medium and to ground. The secondary winding S1 of triggering transformer T1 is connected to the input of amplifier A, the output of which is connected to the input of the high tension generator G1 or pulse generator. Amplifier A is powered by supply G.

When no contact is established between terminals H and J, the state of the circuit may be schematically represented by connecting between H and J, the resistor R, equivalent to the stray resistance between the fence and the earth, and a very small current flows through the primary winding P1 of the transformer T1.

When a contact is established between terminals H and J, the state of the circuit may be represented by connecting between said terminals the impedance Z1 and Z2, Z1 being the fence impedance and Z2 the impedance of the animal having established the contact. Z3 is the fence impedance to the point of contact.

The connection of an impedance, in parallel with the initial resistance R, gives rise to a change of current in the fence circuit, the rate of change being however limited by the fence wire impedance and the impedance of the animal with respect to the earth. This change of current develops across the secondary terminals of transformer T1, a difference of potential incrementally proportional with time to the change of current. This difference of potential is fed to the input of amplifier A which then triggers the high tension generator G1, the pulses delivered by this latter being sent to the fence circuit connected to the output of said high tension generator.

The change of current and corresponding change in voltage occurring in P1 is comparatively small because the invention uses a low voltage source of power. However, according to the invention, the small change in voltage is fed via S1 to an amplifying circuit wherein the same is transformed into a readily usable control signal.

Approximative calculations show that current amplification must reach about 80 db and in actual practice, only a transistor amplifier is able to obtain such amplification, through an autonomous low-tension supply, which is an essential of the system, together with a very small energy consumption.

It should be noted moreover that the amplifier receives two types of signals:

(1) The triggering signal, owing to a contact between terminals H and J.

(2) A part of the high-tension pulse or pulses produced by generator G1, when this latter is connected in series with primary winding P1 of triggering transformer T1.

It is necessary therefore to foresee and plan arrangements which will avoid transferring voltage surges, which might damage it, to the control electrode of the transistors of the first stage of the amplifier.

Finally, all precautions must be taken in the design of the amplifier in order to avoid oscillations in the circuit, either due to the construction of the amplifier itself or on account of the feedback introduced by the coupling of the high-tension generator to the input circuit of the amplifier, or an account of the possibility of a critical reactive coupling between the input and output of the amplifier.

Figure 2:
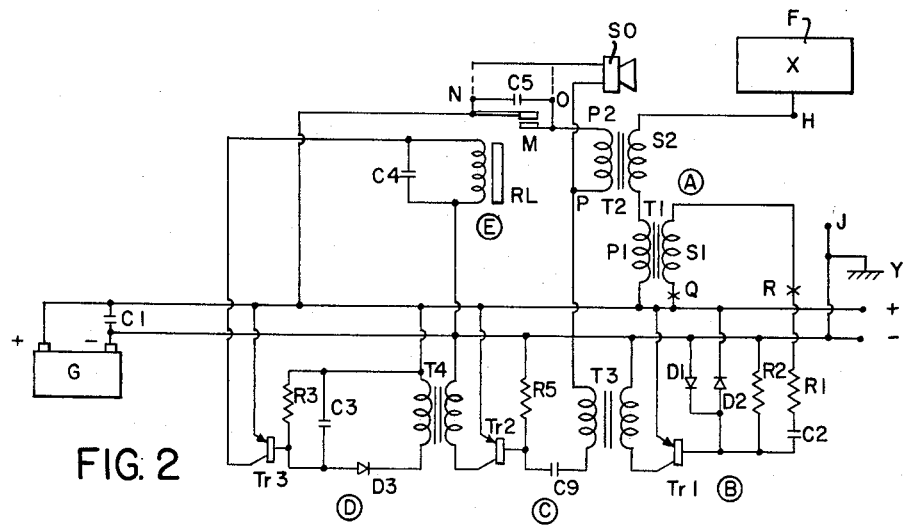
FIG. 2 is a circuit diagram of a preferred embodiment of the apparatus conforming to the invention.

These essentials led to the realization of the control circuit of an electrifying device for a fence such as shown in FIG. 2, as example No. 1.

*Relay-type electrifying system with capacity blocking*

The high-tension generator of FIGURE 2 is composed of a transformer T2 with two windings, where the secondary winding S2 is introduced in the fence circuit which then comprises: The fence, whose wire is schematically designated by F, connected to the terminal H, the secondary winding S2 of transformer T2, the primary winding P1 of triggering transformer T1, the energy supply G, the terminal J connected to the earth. The energy supply G is connected in such a way that the fence wire acquires a positive potential with respect to the earth.

A large condenser C1 is connected in parallel on the energy supply when the latter is composed of a high internal resistance battery.

When a contact is established between the terminals H and J, a voltage pulse appears, as it was explained previously, across the terminals of the secondary winding of transformer T1. This pulse is transmitted to the base of transistor Tr1 which forms the first amplification stage through resistor R1, which can be made variable, and condenser C2.

A bias resistor R2 is connected between the base electrode and the negative terminal of the supply. The emitter of transistor Tr1 is connected to the positive terminal of the supply, while the collector is connected to the negative terminal through the primary winding of coupling transformer T3.

Attention should be drawn to the series circuit composed of diodes D1 and D2 connected in opposition between negative and positive terminals, the point of junction of said diodes being connected to the base of transistor Tr1. The necessity of this circuit will be explained subsequently.

The voltage developed across terminals of the secondary winding of coupling transformer T3 is applied to the base of transistor Tr2, by means of condenser C9, a bias resistor R5 being connected between said base and the negative supply terminal. The emitter of transistor Tr2 is connected to the positive supply terminal, the collector being connected to the negative terminal through the primary winding of coupling transformer T4.

The voltage developed across terminals of the secondary winding of the coupling transformer T4 is transmitted to the base of transistor Tr3, by means of a circuit composed of diode D3 connected in series with resistor R3, condenser C3 being in parallel with this latter. The junction point of parallel circuit R3, C3 and diode D3 is connected to the base of transistor Tr3. The time constant of this circuit determines the conducting time of transistor Tr3. The emitter of the latter is connected to the positive supply signal terminal. The collector is connected to the negative terminal through the energizing winding of relay RL, shunted by condenser C4 in order to reduce the voltage surges across its terminals to a value complying with the breakdown voltage of transistor Tr3. This condenser increases also the time during which the relay is energized.

When the relay is energized, the closing of the associated contacts M gives rise to a current flow from the supply into the primary winding P2 or transformer T2, through the following circuit: positive terminal of supply G. contact M, primary winding P2 of transformer T2, negative terminal of supply G.

When the control pulse disappears, the contacts M open; condenser C5 which is connected between the contacts absorbs the breaking spark. This break gives rise to a high-tension pulse across the terminals of the secondary winding S2 of transformer T2, which is thus transmitted to the fence.

It should be noted that an alarm device S0 is connected across the terminals of the primary winding of transformer T2. This is especially interesting when the fence is designed to prevent persons from crossing it. This device S0 can be composed of either a bell or a shutter relay controlling an acoustic alarm signal. It is noteworthy that the breaking of a fence wire sets up a change of impedance of said fence, which initiates the alarm even if there is no contact established with the earth.

*Protection against high-tension pulse*

As has been previously stated, the transistor amplifier receives two types of signals:

(1) The triggering signal, as it has just been described.

(2) A part of the high-tension pulse, since the primary winding of transformer T1 is connected in series with the secondary winding of transformer T2.

However, depending upon the operating conditions of the device, this voltage can vary from about ten to several hundred of volts, and the transistors do not admit, without damage, more than 10 volts, on their base electrodes.

It would be advisable, therefore, to include in the control circuit a limiting device which naturally does not influence the small control voltage. This is the function of the circuit formed by diodes D1 and D2 which were described previously.

Due to the bend at the origin of the characteristic curves of these diodes, each one opposes a very important resistance to small amplitude signal, such as those delivered by the secondary of transformer T1, no matter what the polarity of the signal is. On the other hand, for higher voltages such as those which appear when the high-tension pulse is transmitted to the fence, either of these diodes becomes conducting, depending upon the polarity of the signal, and prevents damage of the amplifier input transistor Tr1, due to the resulting voltage drop. The diodes D1 and D2 are connected in such a way that the current cannot flow from the supply through these diodes to the transistor Tr1.

*Time constant and blocking*

Finally, it has also been stated previously that the pulse or pulses from the fence circuit, when a contact is established, must comply with the regulations in force; on the other hand, some measures must be taken to prevent or block the oscillations of the system. The amplifier should be designed so as to prevent any reactive coupling between stages:

(a) By a careful lay-out of the elements, mainly of matching transformers.

(b) By locating the windings of transformer T1 opposite those of transformer T2, the two problems being bound together.

They are solved by the use of coupling condensers between stages of the amplifier as shown and described. For each of these amplifier stages the control pulse, or low amplitude, scarcely charges the condenser, but the high-voltage pulse delivered by the T2 transformer gives rise to an important signal, in spite of the presence of the limiting circuit formed by the diodes D1 and D2. The transistor acts then as a rectifier and charges the coupling condenser, which biases the transistor beyond the cut-off voltage and blocks the amplification.

The blocking time depends on the capacity of the condenser and on the resistance connected between the base and the supply. The capacity of the condenser determines its charging time, consequently also the moment at which the blocking takes place. If this capacity is low, the blocking occurs quickly; if it is high, a train of oscillations is produced, but on the other hand, the time during which a contact on the fence does not produce a pulse, is more important.

It should be noticed, however, that the time constant is not solely determined by the values of the condensers and the resistor constituting the coupling circuit; this constant depends on the transistor's characteristics and also on the energy supplied by the high-voltage pulse, therefore, on the characteristics of the fence circuit.

*Electrifying device with converter and blocking circuit*

Figure 3:
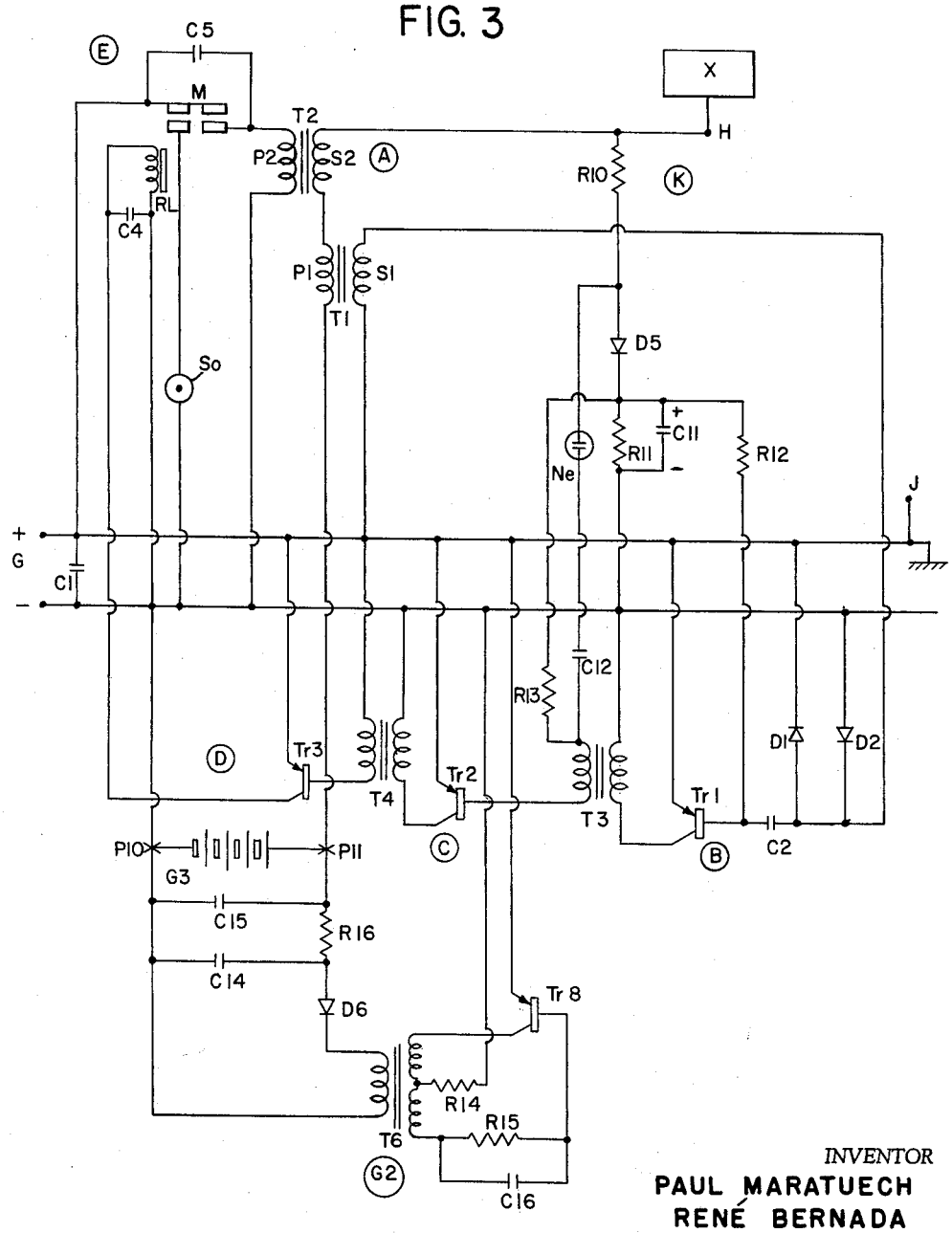
FIG. 3 is a circuit diagram of a modified apparatus conforming to the invention in which an oscillator and rectifier are added to augment the low voltage power source.

FIG. 3 shows a second embodiment of an electrifying device for a fence, according to the invention. It differs from the first in two points: the design of the blocking circuit; the addition of an auxiliary source of energy to increase the sensitivity of the device.

As in the first example, the device comprises a triggering transformer T1, three stages of amplification, constituted by transistors Tr1, Tr2, Tr3, a circuit with relay RL producing high-voltage pulse across the terminal of the secondary winding of transformer T2, this pulse being transmitted between terminals H and J of the fence circuit. It is to be noticed that, contrary to the preceding circuit, the coupling between amplifier stages is carried out solely by transformers. The coupling condensers C2 and C9, of the preceding circuit, are replaced by the condensers C2 and C12, of FIG. 3, which have a secondary function in the blocking device. Condenser C2 mainly helps to isolate the diodes circuit with respect to the D.C. component and C12 helps to decouple resistor R13. A biasing circuit for transistors Tr1 and Tr2, also forming a blocking circuit, is added as well as an oscillating-rectifying circuit constituted by transistor Tr8 and the elements with which it is associated. The operation and the part played by these additional circuits will be explained hereafter; for the identical elements, we should go back to those of FIG. 2 and its description.

The part played by the oscillator-rectifier constituted by the transistor Tr8 and the associated circuit is to increase the sensitivity of the device without increasing the gain of the amplifier stages, in applying on the fence conductor a permanent D.C. voltage which is added to the one provided by the supply G.

*Converting system*

The oscillator is constructed in the following manner: The primary winding of the tapped transformer T6 is connected on one side to the collector of the transistor Tr8, and on the other side to the base of the said transistor, through a parallel circuit formed by condenser C16 and resistor R15. The center tap of the primary of the transformer is connected to the negative terminal of G across resistor R14. The A.C. voltage appearing across the secondary winding of the transformer T6 is rectified by means of diode D6, filtered through a conventional circuit constituted by series resistor R16 and the parallel condensers C14 and C15. In this way, a D.C. voltage between P10 and P11 is obtained and included in the fence circuit which then comprises: the fence X—terminal H—secondary S2 of transformer T2—primary P1 of transformer T1—source of D.C. voltage supplied by the oscillator connected between P11 and P10 (in this case P11 negative, P10 positive)—supply G—the grounded terminal J (the positive terminal of supply G being grounded).

The voltage supplied by the two supplies are added, which increases considerably the sensitivity and the stability of the device. As a matter of fact, the power of the triggering signals produced by the contact of a resistance between the fence conductor and the earth, increases as the square of the voltage. Moreover, the resistance of the imperfect contact supplied by an animal decreases with the voltage. The arrangement which has just been described allows, therefore, a decrease in the amplifier gain, increasing therefore its stability.

It is evident that the circuit which has just been described can be replaced by a D.C. source connected between P10 and P11 in a suitable way as shown in the figure. The amplifier itself works in a similar fashion as the amplifier shown in FIG. 2. The pulse appearing at the moment of contact across terminals of the secondary S1 of transformer T1 is transferred to the transistor Tr1 through condenser C2. As before, the circuit constituted by diodes D1 and D2 has no influence for a signal of that amplitude. The bias circuit of the transistor Tr1 is formed by the resistors R12 and R11 connected in series between the base of said transistor and the negative terminal of the supply G. The pulse, amplified by transistor Tr1, is transferred to transistor Tr2 by means of the coupling transformer T3, the secondary winding of the latter being connected at one end to the base of transistor Tr2 and at the other end to the negative terminal of the supply G, across the resistors R12 and R11, condenser C12, connected between the ground and the junction point of R13, and secondary T3, is a decoupling condenser. The pulse, amplified by transistor Tr2 is transmitted to transistor Tr3 by means of the coupling transformer T4. The collector circuit of transistor Tr3 includes the energizing winding of relay RL which, in this case, requires two sets of associated contacts, one controlling the flow of current in the primary winding of the transformer T2, the other controlling the operation of the alarm device S0.

*Blocking system*

The blocking system of FIG. 3, which is another modification with respect to that shown in FIG. 2, is connected between the junction point of the secondary winding of transformer T2 of the fence wire X and the negative terminal of supply G. This circuit is composed of the fence wire, resistor R10 in series with diode D5 and the resistor R11 (which is part of the bias circuit of the transistors Tr1 and Tr2). Resistor R11 is connected in parallel with condenser C11. A neon tube, or similar device, is connected between the junction point of resistor R10 and diode D5 and the positive terminal of supply G.

The operation of the circuit is the following: The high-voltage pulse applied on the fence is rectified by a diode D5 through the limiting resistor R10, so that in charging condenser C11, the neon tube once started, keeps a constant voltage across the terminals of the diode condenser unit, whatever may be the amplitude of the high-voltage pulse. The positive voltage which appears at the terminals of the condenser C11 is retransmitted to the base of transistors Tr1 and Tr2 by means of the resistors R12 and R13, respectively. This positive voltage blocks the said transistors; the blocking time is determined by the time constant of the circuit formed by the condenser C11 and the resistor R11.

It is, of course, possible to modify parts of the diagrams which have just been described without leaving the scope of the invention.

*High-voltage transformer and combined triggering arrangement*

Figure 4:
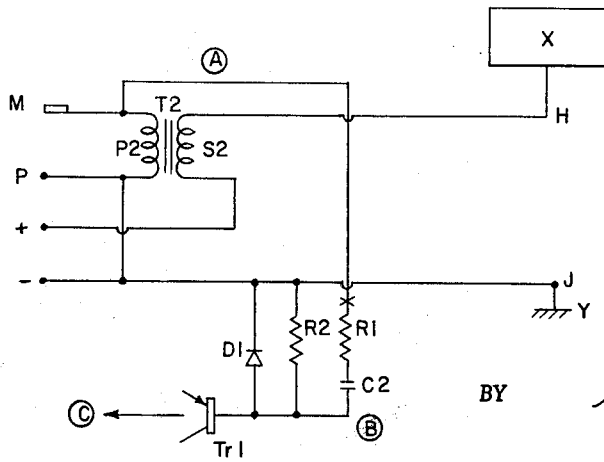
FIGS. 4 and 5 are circuit diagrams illustrating further modifications of the invention.

FIG. 4 show a modified part of any of the foregoing figures, the aim of this modification being to use one transformer only for the triggering and high-voltage functions which allows the saving of one transformer. According to this alternative, the fence circuit is made up as follows: the fence X, connected to the terminal H, the secondary S2 of the transformer T2; one or more supply sources (according to the circuit being used, FIG. 2 or FIG. 3 respectively), the terminal J connected to the ground.

When a triggering current flows in winding S2 of transformer T2, a difference of potential appears across the winding P2, this energy being transmitted to the base of transistor Tr1 which forms the first amplification stage. The other parts of the diagram are not modified, points P and M, and transistor Tr1 being connected to other circuit elements in the same way as shown in FIGS. 2 and 3.

*Fully transistorized system*

Figure 5:
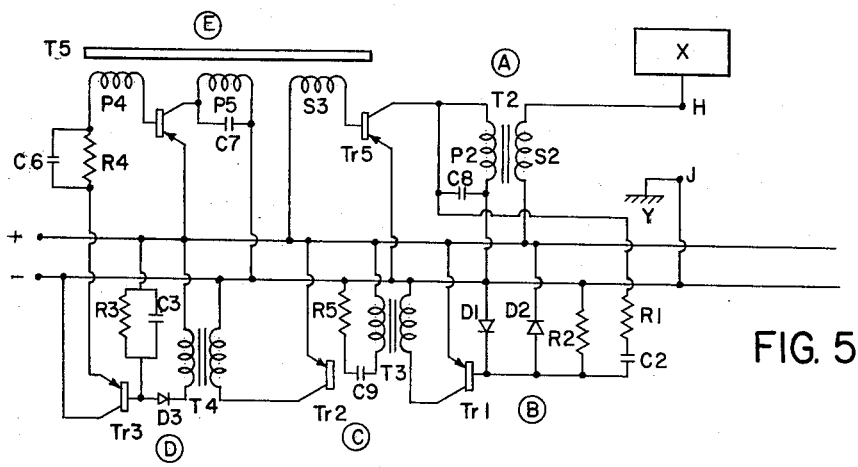

FIG. 5 shows an electrifying system according to the invention, which differs from the foregoing examples in that the system is fully transistorized.

In this alternative, transformer T1 has also been omitted and the operating of the triggering circuit is identical to that of FIG. 4.

The fence circuit comprises: fence X connected to terminal H, secondary winding S2 of transformer T2, the supply source or sources, and terminal J connected to the ground.

A triggering current, flowing through winding S2, following a contact between terminals H and J, develops a difference of potential across winding P2, the corresponding energy being transmitted to the first amplification stage. The circuits formed by transistors Tr1 and Tr2 and the input circuit of transistor Tr3 are identical to those having the same functions and which are shown in FIG. 2.

However, relay RL has been omitted and replaced by a circuit comprising transistors Tr4 and Tr5 and transformer T5 whose function will be described in the following:

The amplified control pulse is transmitted to the base of transistor Tr4 from the output of transistor Tr3 by means of the parallel circuit, formed by resistor R4 and condenser C6, in series with winding P4 of transformer T5, the other end of this winding being connected to the base of Tr4. The emitter of transistor Tr4 is connected to the positive supply terminal; the collector is connected to the negative terminal of said supply through winding P5 of transformer T5, winding P4 and P5 being connected in phase opposition with respect to the base and collector of transistor Tr4.

The first pulse charges condenser C6, a positive voltage appearing across the latter with respect to the base of transistor Tr4. The transistor is blocked.

Condenser C6 discharges slowly through resistor R4 until transistor Tr4 becomes conducting, which initiates another pulse. The rate of these pulses is determined by the value of the resistor R4 and condenser C6. The pulses are transmitted to transistor Tr5 by means of a third winding S3 of transformer T5 connected between the base of said transistor and the positive terminal of the supply. In the normal conditions, transistor Tr5 is therefore blocked. Winding S3 is connected in such a way that the pulses transmitted from the foregoing stage produce a negative potential on the base of transistor Tr5. This latter becomes conducting under the control of said pulses, like a switch establishing the current in winding P2 of transformer T2, then breaking it, which produces a high-tension pulse across the terminals of winding S2 of transformer T2, and consequently on the fence.

Windings P5 and P2 are respectively shunted by condensers C7 and C8 which limit the amplitude of the pulses to a suitable value so as not to damage the transistors.

*Matching circuits for existing electrifying devices*

Figure 6:
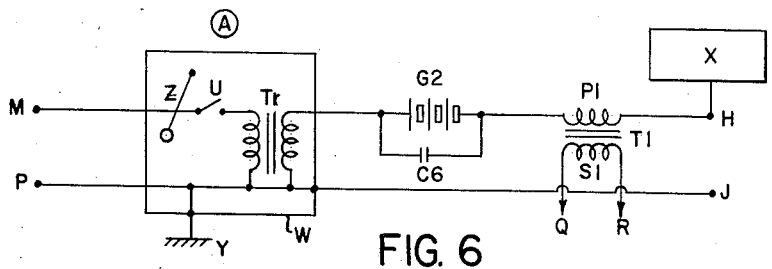
FIGS. 6 and 7 are circuit diagrams illustrating examples of circuits capable of adapting existing apparatus to the principles of the present invention.
Figure 7:
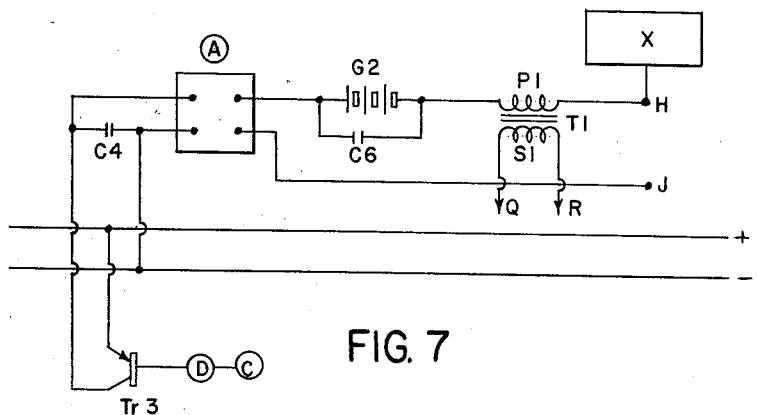

FIGS. 6 and 7 show circuit diagrams which allow the provisioning of existing electrifying devices with the control circuits, according to this invention.

It has already been stated that the electrifying devices A generally used have a contact which is here shown by U, in FIG. 6, controlled by a pendulum Z, of the gravity or spring type, transformer Tr having two windings with common ends connected to box W which is connected to the ground. The fence circuit then is composed of: fence X, winding P1 of triggering transformer T1, the supply G2 shunted by condenser C6, the secondary winding of transformer Tr being used in this case as high-tension transformer, and the earth.

Any contact producing a change of impedance between terminals H and J initiates a difference of potential across the winding of transformer T1; this difference of potential appears between Q and R and is transmitted to the input of the amplifier previously described as indicated in FIGS. 2 and 3, and whose output is connected to M and P. Points Q, M, R, P, are connected as indicated in the foregoing diagrams. In the primary winding of transformer Tr, a current flows when the contact U, controlled by the pendulum, is closed and when contacts M of the amplifier (not shown in the figure under consideration) are also closed. When these contacts U and M are broken, a high-tension pulse appears across the secondary winding of transformer Tr and is thus transmitted to the fence.

FIG. 7 shows a circuit diagram which permits the provisioning of an existing electrifying device with the control circuits according to the invention, in which the circuit comprising the control relay has been omitted. Collector of transistor Tr3 is then directly connected to one of the input terminals of the device A similar to that of FIG. 6 but whose input and output only have been shown. The second input terminal is connected to the negative terminal of the supply.

The collector current of transistor Tr3 which must be a power transistor, charges condenser C4. The voltage appearing across it allows the operation of transformer Tr (not shown, but identical to that of FIG. 6) in the same way as described previously. In this case, the amplifier gain must be greater than in the foregoing example.

The transformer T1 preferably has a ratio between 1 and 5 of the number of turns in S1 and T1 and the transformer T2 preferably has a ratio between 50 and 200 of the number of turns in S2 and T2. Moreover, the source of power G preferably has a voltage between its terminals of from 4 to 24 volts.

The term "low voltage" as used herein means a voltage below 100 volts.

It is evident that the foregoing descriptions have been given only as a way of example and that other alternatives are possible without leaving the scope of the invention. Thus, the transistors may be the the p-n-p type instead of the n-p-n type like those shown; their circuit may also be different, for instance: common base or common emitter. When low consumption tubes will be commercially available, they may be also used. Finally, this device may be used not only in fence electrifying systems but in any systems requiring the delivery of high-voltage pulses, initiated by a change of impedance, without useless energy consumption, in any alarm or protecting system and in special electronic applications. The invention, therefore, is not to be restricted except insofar as is necessitated by the prior art and by the spirit of the appended claims.

What is claimed is:

1. In combination with a conducting barrier, a low voltage D.C. power supply, transformer means coupling said power supply to said barrier, and independent electronic signal generating means powered by said power supply and responsive to an induced voltage in said transformer means for applying a single cycle of shocking voltages to said barrier for any given change.

2. The combination defined in claim 1 wherein said impedance means comprises a transformer and said means responsive to said change includes amplifying means.

3. In combination with a conducting barrier, a low voltage power supply, impedance means coupling said power supply to said barrier, and means powered by said power supply and responsive to a change in current through said impedance means for applying a shocking voltage to said barrier, said last-mentioned means including transistor amplifier means.

4. Electrifying means for use with a conducting barrier, and comprising a voltage D.C. power supply, transformer means coupling said power supply to said barrier, and independent electronic signal generating means powered solely by said power supply and responsive to an induced voltage in said transformer means for applying recurring shocking voltages to said barrier.

5. Apparatus for electrifying a barrier controlled by contact of an object therewith comprising a conducting barrier connected to ground by a circuit containing a low voltage source of potential, means in said circuit for sensing the change in impedance across said barrier and ground caused by contact of an object with said barrier and producing a given duration output signal regardless of the time of contact of the object with the barrier, a high gain amplifier actuated by said output signal, a high voltage generator having an output connected in said barrier circuit and means in the output of said amplifier for triggering said high voltage generator.

6. Apparatus as described in claim 5 wherein is additionally provided an oscillator powered by said low voltage source of potential and a rectifier in the output of said oscillator, the rectified output of said oscillator being connected in said barrier circuit to augment said low voltage source of potential and thereby increase the sensitivity of the apparatus to objects contacting the barrier.

7. Apparatus as described in claim 5 wherein said means for sensing the change in impedance across said barrier and ground comprises a transformer whose secondary is connected in said barrier circuit and whose primary is connected to the input of said high gain amplifier, said transformer additionally forming part of said high voltage generator and having its primary energized by the output signal of said amplifier.

8. Apparatus as described in claim 7 wherein said means in the output of said amplifier for triggering said high voltage generator comprises a resistor bridged by a capacitor and a plurality of transistors coupled by transformer windings so connected as to form switching circuits, the output of said last transistor being connected to the primary of said transformer.

9. Apparatus as described in claim 5 wherein said means for sensing the change in impedance across said barrier and ground comprises a transformer whose primary is connected in said barrier circuit and whose secondary is connected to the input of said high gain amplifier.

10. Apparatus as described in claim 9 wherein said high gain amplifier comprises a plurality of transformer coupled transistor stages.

11. Apparatus as described in claim 10 wherein the last of said transistor stages is provided with a resistor capacitor network in its input to determine the time duration of the output pulse of said amplifier.

12. Apparatus as described in claim 9 wherein said means in the output of the amplifier for triggering said high voltage generator comprises a relay and a second transformer arranged so that closing of the relay contacts will connect the second transformer across said low voltage source of potential and opening of the relay contacts will pulse the transformer secondary, said second transformer having its secondary winding connected in said barrier circuit.

13. Apparatus as described in claim 12 wherein the windings of said second transformer respectively oppose the windings of the first named transformer.

14. Apparatus as described in claim 12 wherein coupling condensers are additionally provided at the input and between stages of said amplifier to bias the transistors beyond cut-off during high voltage surges in said barrier circuit.

15. Apparatus as described in claim 12 wherein an alarm is connected across the primary terminals of said second transformer.

16. Apparatus as described in claim 12 wherein means for protecting said amplifier from high potential surges is connected to the input of said amplifier.

17. Apparatus as described in claim 16 wherein said means for protecting the amplifier from high potential surges comprises a pair of diodes of opposite polarity connected in series across said source of low potential, the center point between said diodes being connected to the amplifier input.

18. Apparatus as described in claim 16 wherein said means for protecting said amplifier from high potential surges comprises a diode and a resistor in series connected between said barrier and one side of said low voltage source of potential, a neon tube connected between said barrier and the other side of said low voltage source, a capacitor bridging said resistor, and a resistive connection from the common diode, resistor, capacitor junction to the input of said amplifier.

19. In combination with a conducting barrier, a low voltage power supply, first transformer means coupling said power supply to said barrier, relay means, second transformer means coupled to said power supply via said relay means, and transistor means powered by said power supply and responsive to a change in current through said first transformer means for operating said relay means and thereby applying a shocking voltage to said barrier through said second transformer means.

20. A method of operating electrifying means adapted to supply shocking impulses to an electrically conductive barrier, comprising the steps of sensing changes in resistance between said barrier and ground, producing in response to each change sensed an output signal of a given duration regardless of the duration of the change, and operating said electrifying means only once in response to each output signal.

21. Electrifying means for use with a conducting barrier and comprising a power supply, impedance means coupling said power supply to said barrier whereby at most an insignificant current flows through said barrier, said impedance means including sensing means for producing an output signal of given duration in response to a change in the current flow through said barrier regardless of the duration of said change, and means responsive to said output signal for applying only a single shocking voltage signal cycle to said barrier in response to any one given change in said current flow.

22. In combination with a conducting barrier, a low voltage power supply, sensing means coupling said power supply with said barrier, said sensing means including means for producing a given duration signal when a conducting medium connects a part of said barrier to ground regardless of the duration of the connection to ground, and means powered by said power supply for applying a shocking voltage to said barrier in response to said signal, the last-mentioned means including amplifier means for amplifying said signal and independent signal generating means for producing said shocking voltage.

References Cited by the Examiner
UNITED STATES PATENTS

| | | | |
|---|---|---|---|
| 2,415,944 | 2/47 | Fagan | 256—10 |
| 2,422,012 | 6/47 | Greenlee | 307—132 |
| 2,443,232 | 6/48 | Fagen | 307—132 |
| 2,500,311 | 3/50 | Fagan | 256—10 |

LLOYD McCOLLUM, *Primary Examiner.*

LAWRENCE V. EFNER, HARRISON R. MOSELEY,
*Examiners.*